J. McCONNELL,

Assignor of one-half to J. W. HAYWARD.

Oil Stove.

No. 9,606. Reissued March 15, 1881.

WITNESSES

E. J. Nottingham

A. M. Bright.

INVENTOR

J. McConnell.

By Sewell & Sewell.

ATTORNEYS

N. PETERS, PHOTO-LITHOGRAPHER, WASHINGTON, D. C.

UNITED STATES PATENT OFFICE.

JOHN McCONNELL, OF CLEVELAND, OHIO, ASSIGNOR OF ONE-HALF TO J. WILLIS HAYWARD, OF SAME PLACE.

OIL-STOVE.

SPECIFICATION forming part of Reissued Letters Patent No. 9,606, dated March 15, 1881.

Original No. 180,486, dated August 1, 1876. Application for reissue filed January 2, 1880.

*To all whom it may concern:*

Be it known that I, JOHN McCONNELL, of Cleveland, in the county of Cuyahoga and State of Ohio, have invented certain new and useful Improvements in Portable and Oil Stoves; and I do hereby declare the following to be a full, clear, and exact description of the invention, such as will enable others skilled in the art to which it pertains to make and use it, reference being had to the accompanying drawings, which form part of this specification.

My invention relates to an improvement in stoves intended for using oil as fuel.

Figure 1:
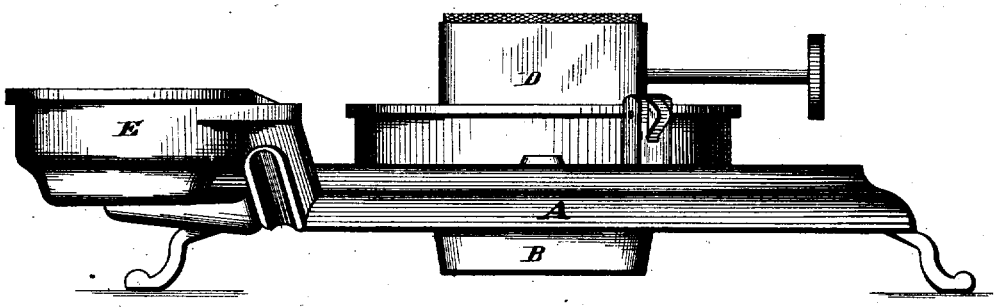
Figure 2:
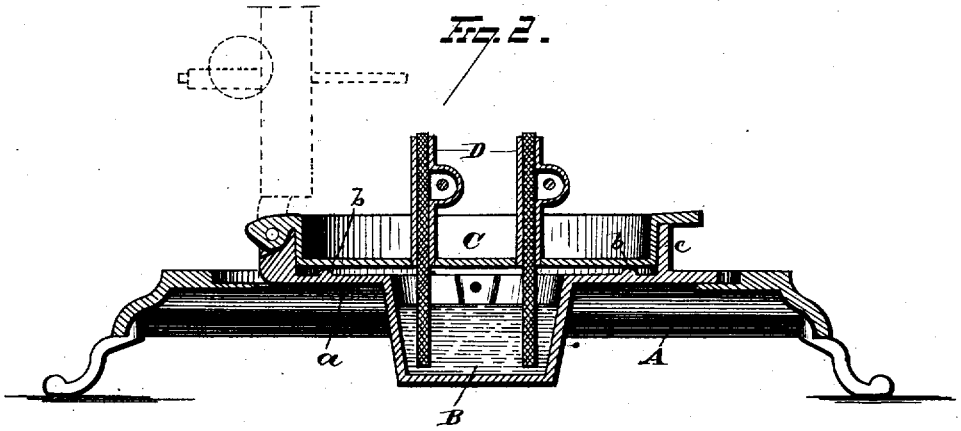
Figure 3:
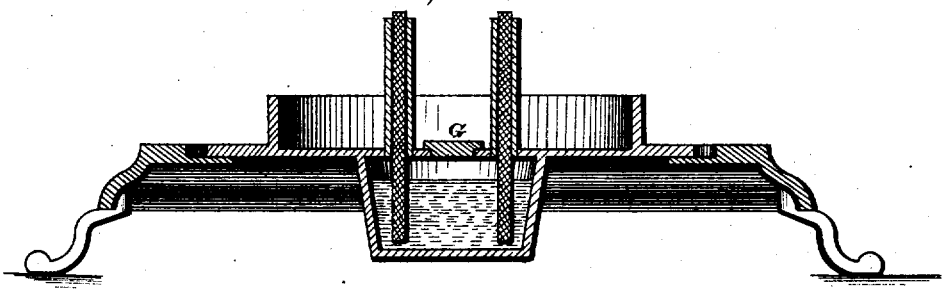

In the drawings, Figure 1 is an isometric view of a stove according to my invention, and Fig. 2 is a view, in cross-section, of the same, the dotted lines showing the feature of the removable or hinged top lid or pan that holds the burners. Fig. 3 is a vertical sectional view of a modification.

My invention consists in the following parts and combinations, as hereinafter specified and claimed, wherein—

A is a suitable frame, of metal or wood, for holding and supporting the oil-reservoir B, hinged top C, burners D, and box E, whereby the entire device may be made portable.

If desired, the frame A may be made sufficiently large to accommodate two or more burners and attachments.

The oil-reservoir B is placed directly beneath the burners D. The burners D are fixed upon the lid C. This lid is made in the form of a pan or dish, and may contain water, glycerine, or the like, whereby the oil beneath may be kept cool. The lid or pan C is also galvanized, which lessens its heat-conducting qualities, and, further, prevents the oil in the reservoir becoming heated. The lid C is hinged to the reservoir, and thus the burners attached to the hinged lid are always retained in proper position, the wicks made readily accessible, and the reservoir easily filled.

The box E is intended to contain wicks, trimmers, and tools necessary to use about the stove.

It will be noticed that I make the rim or edge of the lid or cover C to cover over and completely protect the upper edge of the oil-reservoir, so that no dirt, water, or foreign matter shall reach the oil. In the present instance I have shown a flange upon the rim of the lid or cover C that overlaps the top of the oil-reservoir. If, by any chance, the oil in the reservoir should become heated to such an extent as to generate explosive gas or vapor, the same may readily escape without danger by either lifting the lid C or escaping between the lid C and oil-reservoir without lifting said lid.

A great advantage gained by the hinged lid is that the reservoir can not only be readily filled, but the wicks, should they drop into the reservoir or get out of reach, or for any reason become inoperative, can be readily reached and connected without damage or expense.

The oil-reservoir is provided with a horizontal plate, *a*, formed about it, and an annular rib, *b*, projects upwardly from this plate. Upon this rib the cover rests when in lowered position, as shown in full lines in Fig. 2. A vertical annular flange, *c*, is formed upon plate *a*, extending around the rib, and within the opening formed by this vertical flange the dish-shaped cover fits. Into this cover are directly inserted the wick-tubes, said cover being of cast-iron, and formed with sufficient body or thickness to present short tubular bearing-surfaces for the wick-tubes.

Fig. 3 of the drawings shows a modification of my invention wherein, instead of the entire cover of the oil-reservoir being made removable, only a part of it is made so by the provision of a cap, G, so located that through the opening made by its removal the reservoir can be replenished, and the wicks be reached from beneath when necessary.

I make no broad claim to a removable lid on an oil-stove; and, further, I do not claim an oil-stove having a hinged cover not having the wick-tubes secured thereto.

I am aware that hinged lamp-burners having closely-fitting flanges are old; but such devices were not adapted to be readily raised to allow of the escape of any explosive gases, and only cover a small portion of the oil-reservoir, while in my improved oil-stove the hinged cover extends over the entire top of the oil-reservoir, and is adapted to be readily raised to allow of the escape of any explosive gases.

What I claim is—

1. In an oil-stove, the combination, with an oil-reservoir, of a cover having wick-tubes permanently secured thereto, said cover being hinged at one side of the oil-reservoir, substantially as set forth.

2. In an oil-stove, the combination, with an oil-reservoir having an annular rib projecting upwardly from the plate or flange encircling the same, of a cover provided with wick-tubes and hinged at one side of the oil-reservoir, substantially as set forth.

3. In an oil-stove, the combination, with an oil-reservoir having an annular vertical flange surrounding the same, of a dish-shaped cover adapted to fit within said upright flange, said cover being provided with wick-tubes and hinged at one side of the oil-reservoir, substantially as set forth.

4. As a new article of manufacture, an oil-stove consisting of a supporting-frame having a tool-box connected therewith, and a removable oil-reservoir provided with a dish-shaped cover hinged thereto, substantially as set forth.

5. In an oil-stove, the combination, with a supporting-frame, of a plate having a depending oil-reservoir cast upon its under side, said oil-reservoir being inaccessible for filling, except through its top, and an upright annular flange cast on the upper side of the plate, substantially as set forth.

In testimony whereof I have hereunto set my hand in the presence of two witnesses.

JOHN McCONNELL.

Witnesses:
JNO. CROWELL, Jr.,
WILLARD FRACKER.